(12) United States Patent
Mori et al.

(10) Patent No.: US 11,945,120 B2
(45) Date of Patent: Apr. 2, 2024

(54) ROBOT CONTROL DEVICE, ABNORMALITY DIAGNOSIS METHOD, AND NON-TRANSITORY COMPUTER READABLE MEDIUM

(71) Applicant: OMRON Corporation, Kyoto (JP)

(72) Inventors: Yasumoto Mori, Kyoto (JP); Maki Endo, Kyoto (JP); Teruyuki Shiraki, Kyotanabe (JP)

(73) Assignee: OMRON Corporation, Kyoto (JP)

( * ) Notice: Subject to any disclaimer, the term of this patent is extended or adjusted under 35 U.S.C. 154(b) by 867 days.

(21) Appl. No.: 16/969,184

(22) PCT Filed: Feb. 19, 2019

(86) PCT No.: PCT/JP2019/006108
§ 371 (c)(1),
(2) Date: Aug. 11, 2020

(87) PCT Pub. No.: WO2019/171939
PCT Pub. Date: Sep. 12, 2019

(65) Prior Publication Data
US 2020/0368908 A1  Nov. 26, 2020

(30) Foreign Application Priority Data
Mar. 7, 2018  (JP) ................. 2018-041135

(51) Int. Cl.
*B25J 9/16* (2006.01)
*B25J 9/12* (2006.01)
(Continued)

(52) U.S. Cl.
CPC ......... *B25J 9/1674* (2013.01); *B25J 19/0066* (2013.01); *B25J 19/02* (2013.01); *B25J 9/12* (2013.01)

(58) Field of Classification Search
CPC ...... B25J 9/1674; B25J 19/0066; B25J 19/02; B25J 9/12
See application file for complete search history.

(56) References Cited

U.S. PATENT DOCUMENTS

2016/0347356 A1* 12/2016 Matsuda ................ B62D 5/003
2017/0015004 A1*  1/2017 Osaka ................... B25J 9/1641
(Continued)

FOREIGN PATENT DOCUMENTS

JP  S61-136792  6/1986
JP  2002268728  9/2002
(Continued)

OTHER PUBLICATIONS

"International Search Report (Form PCT/ISA/210) of PCT/JP2019/006108", dated Mar. 26, 2019, with English translation thereof, pp. 1-3.
(Continued)

*Primary Examiner* — Behrang Badii
*Assistant Examiner* — Jay Khandpur
(74) *Attorney, Agent, or Firm* — JCIPRNET (57) ABSTRACT

A robot control device, abnormality diagnosis method, and non-transitory computer readable medium are provided. The robot control device (300) performs abnormality diagnosis of a robot body (200) including a motor (201) that rotates, from a starting angle position to a target angle position, a rotational shaft (204) for transmitting power to an arm (203) so that the arm performs a predetermined operation. The robot control device includes: a drive control unit (304) driving the motor so that the rotational shaft rotates from the starting angle position to the target angle position within a rotational speed range of the rotational shaft in which it is possible to detect a vibration component caused by an abnormality from among the vibration components gener-
(Continued)

ated along with the rotation of the rotational shaft; a vibration detection unit (305) detecting the vibration component; and a diagnosis unit performing abnormality diagnosis based on the detected vibration component.

6 Claims, 8 Drawing Sheets

(51) Int. Cl.
      *B25J 19/00*       (2006.01)
      *B25J 19/02*       (2006.01)

(56) References Cited

U.S. PATENT DOCUMENTS

| | | | |
|---|---|---|---|
| 2017/0087719 A1 | 3/2017 | Tsuchiya | |
| 2018/0105064 A1* | 4/2018 | Matsubara | F02N 11/04 |
| 2018/0236998 A1* | 8/2018 | Ono | B60W 10/02 |
| 2019/0137984 A1* | 5/2019 | Maekawa | G06N 5/046 |
| 2019/0255701 A1* | 8/2019 | Blankespoor | B25J 15/0616 |

FOREIGN PATENT DOCUMENTS

| | | | |
|---|---|---|---|
| JP | 2002268728 A | * | 9/2002 |
| JP | 2006281421 | | 10/2006 |
| JP | 2009109350 | | 5/2009 |
| JP | 2012139770 | | 7/2012 |
| JP | 2015199149 | | 11/2015 |
| JP | 2017061001 | | 3/2017 |
| JP | 2017120649 | | 7/2017 |

OTHER PUBLICATIONS

"Written Opinion of the International Searching Authority (Form PCT/ISA/237) of PCT/JP2019/006108", dated Mar. 26, 2019, with English translation thereof, pp. 1-6.

"Search Report of Europe Counterpart Application", dated Oct. 25, 2021, p. 1-p. 8.

"Office Action of Europe Counterpart Application", dated Aug. 31, 2023, p. 1-p. 9.

* cited by examiner

ROBOT CONTROL DEVICE, ABNORMALITY DIAGNOSIS METHOD, AND NON-TRANSITORY COMPUTER READABLE MEDIUM

CROSS-REFERENCE TO RELATED APPLICATION

This application is a 371 application of the international PCT application serial no. PCT/JP2019/006108, filed on Feb. 19, 2019, which claims the priority benefit of Japan application no. 2018-041135, filed on Mar. 7, 2018. The entirety of each of the above-mentioned patent applications is hereby incorporated by reference herein and made a part of this specification.

BACKGROUND

Technical Field

The present invention relates to a robot control device, an abnormality diagnosis method, and a non-transitory computer readable medium.

Related Art

In a production line for manufacturing industrial products, a plurality of robots operates in cooperation with each other, and thus the production line may stop even if one robot fails. For example, in a robot body configured to amplify an output torque of a motor by a speed reducer and transmit the amplified torque to an arm, when the inside of the speed reducer is damaged, unnecessary vibration may be generated when the arm is driven, and the positioning precision of the arm may deteriorate. Because repairing or replacing work of a part (for example, the speed reducer) of the robot may take a long time, serious damage may be caused when the production line is stopped for a long time due to a failure of the robot. In view of the above circumstance, patent literature 1 discloses an abnormality detection method for a robot, in which a natural frequency of the arm is measured in advance at the joint of the robot body, and a constant speed operation at the operation speed at which the arm resonates most due to vibration generated by the motor driving the arm and the speed reducer thereof is set as the operation condition for abnormality detection of the robot body, and when a torque fluctuation value calculated from a motor torque value obtained by temperature correction using a temperature sensor installed in the motor or the speed reducer exceeds a preset threshold value, it is judged that an abnormality has occurred in the robot body.

LITERATURE OF RELATED ART

Patent Literature

Patent literature 1: Japanese Patent Laid-Open No. 2006-281421

SUMMARY

Problems to be Solved

Meanwhile, it is known that the frequency of a vibration component generated due to damage of the robot part (for example, damage inside the speed reducer) is proportional to the rotational speed of the motor.

However, it does not mean that there is no problem in detecting the vibration component caused by the abnormality at any rotational speed of the motor; for example, in a frequency band higher than a response frequency determined by the performance, fixing method or the like of a vibration sensor that detects the vibration component, it becomes difficult to detect the vibration component caused by the abnormality. Even when a torque sensor that detects a vibration component superimposed on the output torque of the motor is used, similarly, it becomes difficult to detect the vibration component caused by the abnormality in the frequency band higher than the response frequency. On the other hand, when the rotational speed of the motor is extremely low, the vibration component caused by the abnormality is less likely to appear, which makes detection difficult. As described above, the rotational speed range of the motor may include ranges unsuitable for detecting the vibration component caused by the abnormality.

On the other hand, each robot used in the production line is designed to repeatedly perform a predetermined specific operation (for example, transportation, assembly, welding or the like of parts) according to the role of the robot. This operation of the robot is referred to as teaching playback, and many robots used in the production line operate based on the teaching playback. For example, when the robot arm is operated based on the teaching playback, an operation command for moving the arm from a certain coordinate to a target coordinate is input from a controller to a servo driver, and a current is supplied from the servo driver to the motor so that the arm operates according to the operation command. In this case, conventionally, the operation command input from the controller to the servo driver does not include an operation command for designating the rotational speed of the motor, and the rotational speed of the motor may be in the range unsuitable for detecting the vibration component caused by an abnormality, and thus it is difficult to accurately diagnose the abnormality of the robot. As described above, according to a method for making the operation of the robot during abnormality diagnosis the same as the specific operation normally performed based on the teaching playback, the time for teaching the robot operation for abnormality diagnosis can be saved, but the rotational speed of the motor during abnormality diagnosis may not be in the range suitable for detecting the vibration component caused by the abnormality.

According to a method for newly teaching the operation for abnormality diagnosis of the robot so that the rotational speed of the motor during abnormality diagnosis is within the range suitable for detecting the vibration component caused by the abnormality, the rotational speed of the motor is within the range suitable for detecting the vibration component caused by the abnormality, but this operation for abnormality diagnosis of the robot is different from the above specific operation normally performed by the robot and thus interferes with other robots or equipment disposed around the robot in which abnormality diagnosis is performed. In addition, it also takes time to teach the robot operation for abnormality diagnosis.

As described above, any one of the above methods is insufficient for easily and accurately performing the abnormality diagnosis of the robot body.

Therefore, in order to solve this problem, an objective of the present invention is to propose a technique for easily and accurately performing abnormality diagnosis of a robot body.

Means to Solve Problems

In order to solve the above problems, a robot control device according to one aspect of the present invention performs abnormality diagnosis of a robot body including a motor that rotates a rotational shaft from a starting angle position to a target angle position, wherein the rotational shaft transmits power to an arm so that the arm performs a predetermined operation. The robot control device includes: a drive control unit that drives the motor so that the rotational shaft rotates from the starting angle position to the target angle position within a rotational speed range of the rotational shaft in which it is possible to detect a vibration component caused by an abnormality from among the vibration components generated along with a rotation of the rotational shaft; a vibration detection unit that detects the vibration component; and a diagnosis unit that performs the abnormality diagnosis based on the vibration component that has been detected. In the abnormality diagnosis, the precision of the abnormality diagnosis can be improved by adjusting the rotational speed of the rotational shaft into the rotational speed range in which it is possible to detect the vibration component caused by an abnormality from among the vibration components generated along with rotation of the rotational shaft. In addition, in the abnormality diagnosis, by rotating the rotational shaft from the starting angle position to the target angle position, the arm operation during the abnormality diagnosis is the same as the predetermined operation, and thus interference with other robots or equipment disposed around the robot can be suppressed. In addition, the time for teaching the robot operation for abnormality diagnosis can be saved.

Within the rotational speed range of the rotational shaft in which it is possible to detect the vibration component caused by the abnormality, a first rotational speed profile of the rotational shaft when the rotational shaft rotates from the starting angle position to the target angle position may be different from a second rotational speed profile of the rotational shaft while the rotational shaft rotates from the starting angle position to the target angle position when the arm performs the predetermined operation. Thereby, the rotational shaft can be rotated in the rotational speed profile suitable for abnormality diagnosis.

Within the rotational speed range of the rotational shaft in which it is possible to detect the vibration component caused by the abnormality, the first rotational speed profile and the second rotational speed profile of the rotational shaft when the rotational shaft rotates from the starting angle position to the target angle position may include a period during which a rotational speed of the rotational shaft is constant. Thereby, the frequency of the vibration component caused by an abnormality becomes substantially constant, and the detection precision of the vibration component caused by an abnormality can be improved.

An abnormality diagnosis method according to another aspect of the present invention is an abnormality diagnosis method in which a robot control device diagnoses an abnormality of a robot body including a motor that rotates a rotational shaft from a starting angle position to a target angle position, wherein the rotational shaft transmits power to an arm so that the arm performs a predetermined operation; the robot control device executes: a step for driving the motor so that the rotational shaft rotates from the starting angle position to the target angle position within a rotational speed range of the rotational shaft in which it is possible to detect a vibration component caused by the abnormality from among the vibration components generated along with a rotation of the rotational shaft; a step for detecting the vibration component; and a step for performing the abnormality diagnosis based on the vibration component that has been detected. In the abnormality diagnosis, the precision of the abnormality diagnosis can be improved by adjusting the rotational speed of the rotational shaft into the rotational speed range in which it is possible to detect the vibration component caused by an abnormality from among the vibration components generated along with rotation of the rotational shaft. In addition, in the abnormality diagnosis, by rotating the rotational shaft from the starting angle position to the target angle position, the arm operation during the abnormality diagnosis is the same as the predetermined operation, and thus interference with other robots or equipment disposed around the robot can be suppressed. In addition, the time for teaching the robot operation for abnormality diagnosis can be saved.

An non-transitory computer readable medium storing an abnormality diagnosis program according to another aspect of the present invention is an abnormality diagnosis program for causing a robot control device to execute abnormality diagnosis of a robot body including a motor that rotates a rotational shaft from a starting angle position to a target angle position, wherein the rotational shaft transmits power to an arm so that the arm performs a predetermined operation; the robot control device is caused to execute: a step for driving the motor so that the rotational shaft rotates from the starting angle position to the target angle position within a rotational speed range of the rotational shaft in which it is possible to detect a vibration component caused by an abnormality from among the vibration components generated along with a rotation of the rotational shaft; a step for detecting the vibration component; and a step for performing the abnormality diagnosis based on the vibration component that has been detected. In the abnormality diagnosis, the precision of the abnormality diagnosis can be improved by adjusting the rotational speed of the rotational shaft into the rotational speed range in which it is possible to detect a vibration component caused by an abnormality from among the vibration components generated along with rotation of the rotational shaft. In addition, in the abnormality diagnosis, by rotating the rotational shaft from the starting angle position to the target angle position, the arm operation during the abnormality diagnosis is the same as the predetermined operation, and thus interference with other robots or equipment disposed around the robot can be suppressed. In addition, the time for teaching the robot operation for abnormality diagnosis can be saved.

Effect

According to the present invention, it is possible to easily and accurately diagnose an abnormality of a robot body.

DESCRIPTION OF THE EMBODIMENTS

Hereinafter, an embodiment according to one aspect of the present invention (hereinafter, also referred to as "the embodiment") is described with reference to the drawings. The embodiment is intended to facilitate the understanding of the present invention but not to limit the interpretation of the present invention. The present invention can be modified or improved without departing from the gist thereof, and the present invention also includes equivalents thereof. Besides, the same constituents are denoted by the same reference signs, and duplicate description is omitted.

Application Example

Figure 1:
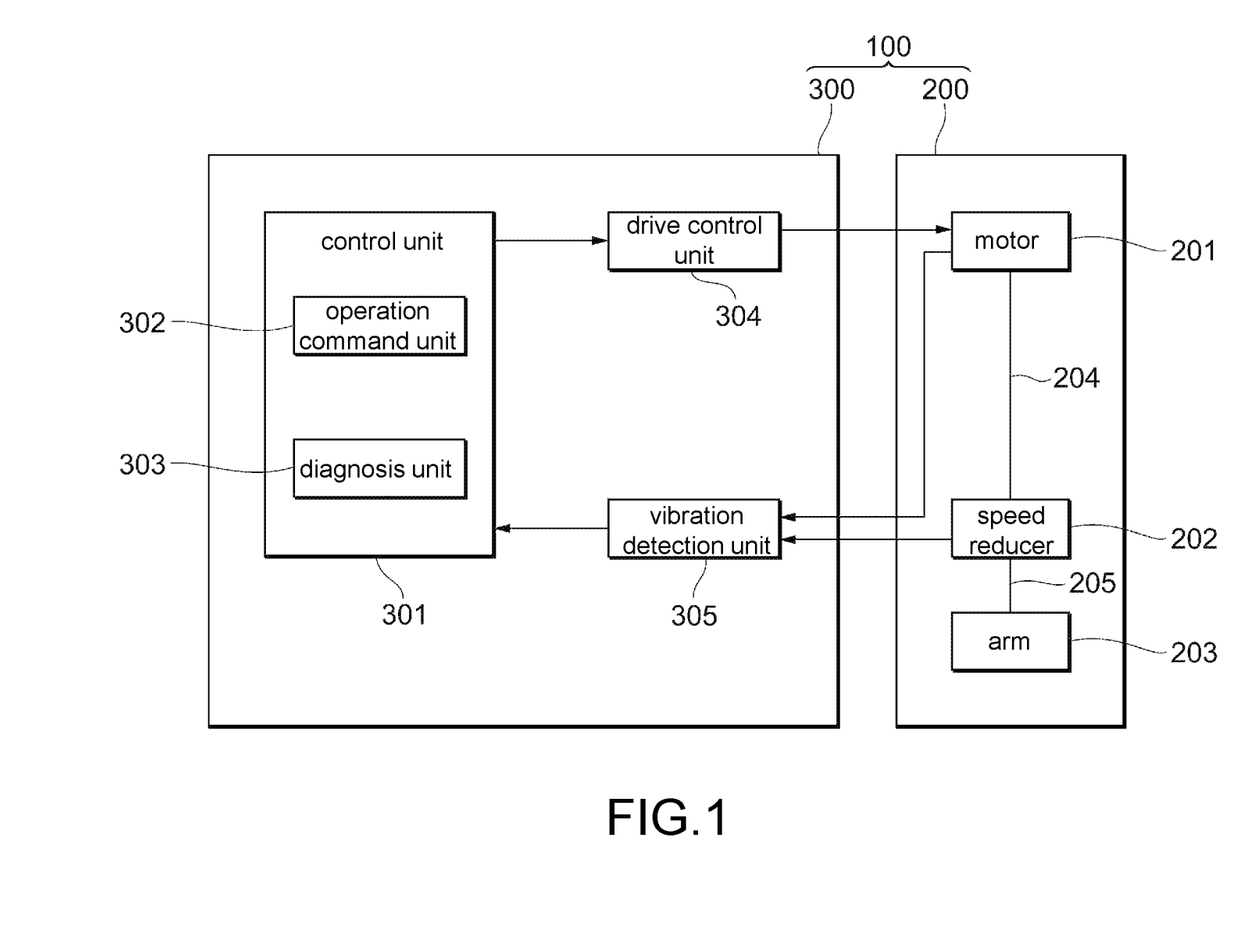
FIG. 1 is an illustrative diagram showing an example of the configuration of a robot according to an embodiment.

First, an application example of the present invention is described with reference to FIG. 1. FIG. 1 shows an example of the configuration of a robot 100 according to the embodiment. The robot 100 may include, for example, a robot body 200 and a robot control device 300. The robot control device 300 is a computer system that controls the operation of the robot body 200. Specific examples of the robot 100 include a vertical articulated robot, a horizontal articulated robot, an orthogonal robot, a parallel link robot, and the like. The robot 100 operates as an autonomously operating manipulator and can be used for any application such as assembly, transportation, painting, inspection, polishing, or cleaning of parts.

The robot body 200 may include, for example, an arm 203 that operates as a manipulator, a motor 201 that rotates a rotational shaft 204 for transmitting power to the arm 203, and a speed reducer 202 that reduces a rotational speed of the rotational shaft 204 to increase a torque and transmits power having the increased torque to the arm 203 through an output shaft 205. The rotational shaft 204 may be, for example, the output shaft of the motor 201, and in this case, the rotational speed of the motor 201 and the rotational speed of the rotational shaft 204 match with each other. For convenience of description, FIG. 1 illustrates a case in which the number of shafts (the number of joints) of the robot body 200 is one, but the number of shafts may be two or more (for example, 4 to 7 shafts).

The robot control device 300 may include, for example, an operation command unit 302 that generates an operation command for the motor 201, a drive control unit 304 that controls driving of the motor 201 in response to the operation command from the operation command unit 302, a vibration detection unit 305 that detects a vibration component generated along with rotation of the rotational shaft 204 rotating by the power from the motor 201, and a diagnosis unit 303 that perform frequency-analysis on the vibration component detected by the vibration detection unit 305 to perform abnormality diagnosis. The vibration detection unit 305 may detect a vibration component superimposed on the output torque of the motor 201, or may detect a vibration component generated from a part (for example, the speed reducer 202) of the robot body 200. The robot control device 300 may include, for example, a control unit 301 having a microcomputer, and the functions of the operation command unit 302 and the diagnosis unit 303 may be realized by an information processing function of the microcomputer of the control unit 301.

For example, the robot 100 may be designed so that the arm 203 performs a predetermined operation based on teaching playback. In this specification, the operation predetermined by teaching is also referred to as a normal operation in order to be distinguished from the operation of the arm 203 during abnormality diagnosis. The motor 201 rotates the rotational shaft 204 from a starting angle position to a target angle position, and thereby the arm 203 performs the normal operation. Here, the starting angle position is an angle position of the rotational shaft 204 when the arm 203 starts the normal operation. The target angle position is an angle position of the rotational shaft 204 when the arm 203 ends the normal operation.

When the abnormality diagnosis is performed on the rotational shaft 204, the drive control unit 304 drives the motor 201 so that the rotational shaft 204 rotates from the starting angle position to the target angle position within the rotational speed range of the rotational shaft 204 in which it is possible to detect a vibration component caused by an abnormality from among the vibration components generated along with the rotation of the rotational shaft 204. Here, in the specification, the abnormality of the robot means a state in which a regular operation of the robot is hindered or a state in which this hindrance is expected to occur in the future, and the abnormality includes, for example, failure, damage, wear, distortion, deformation, and the like. Among these abnormalities, particularly, a state in which there is a significant hindrance to the operation of the robot is referred to as failure. The upper limit of the rotational speed range of the rotational shaft 204 in which it is possible to detect the vibration component caused by the abnormality may be determined by, for example, the performance (for example, the response frequency) of the vibration detection unit 305, the structure (for example, the pitch circle of bearings, the diameter, number, contact angle and the like of rolling elements) or the specification (for example, the speed reduction ratio) of the speed reducer 202, and the like. The rotational speed profile of the rotational shaft 204 during abnormality diagnosis may be different from the rotational speed profile of the rotational shaft 204 during the normal operation. In the specification, the rotational speed profile means a characteristic of time change of the rotational speed. The diagnosis unit 303 performs the abnormality diagnosis (for example, the presence/absence of damage to a part interlocked with the rotation of the rotational shaft 204) based on the vibration component detected by the vibration detection unit 305.

In this manner, in the abnormality diagnosis, the precision of the abnormality diagnosis can be improved by adjusting the rotational speed of the rotational shaft 204 into the rotational speed range in which it is possible to detect the vibration component caused by an abnormality from among the vibration components generated along with the rotation of the rotational shaft 204. In addition, in the abnormality diagnosis, by rotating the rotational shaft 204 from the starting angle position to the target angle position, the operation of the arm 203 during abnormality diagnosis is the same as the normal operation, and thus interference with other robots or equipment disposed around the robot 100 can be suppressed.

[First Hardware Configuration]

Figure 2:
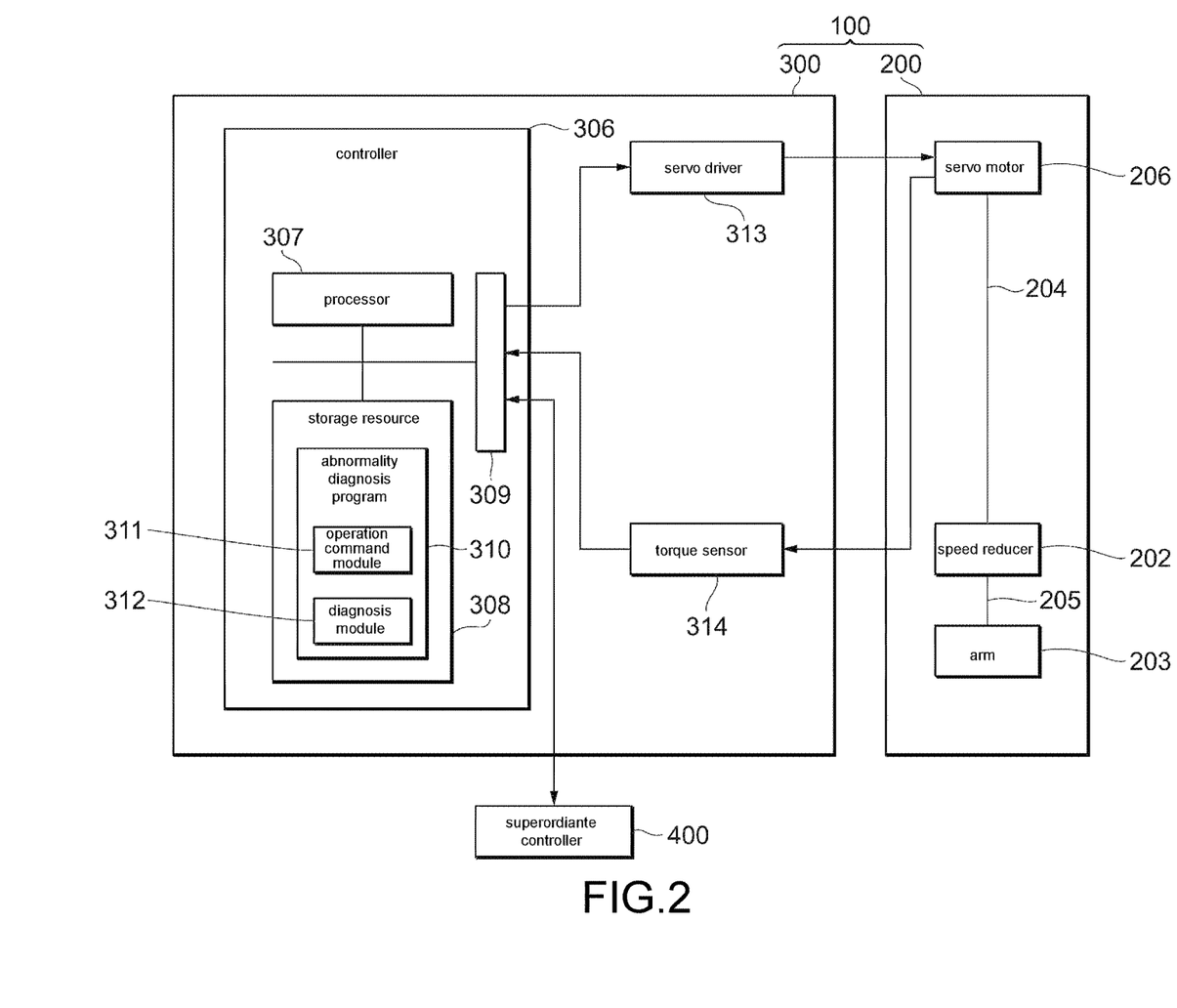
FIG. 2 is an illustrative diagram showing an example of a first hardware configuration of the robot according to the embodiment.

Next, an example of a first hardware configuration of the robot 100 is described centering on FIG. 2 and appropriately referring to FIG. 1.

The robot body 200 includes a servo motor 206 with an encoder as an example of the motor 201 shown in FIG. 1.

The robot control device 300 includes a controller 306 as an example of the control unit 301 shown in FIG. 1.

The controller 306 may be a microcomputer that includes, for example, a processor 307, a storage resource 308, and an input/output interface 309, as hardware resources. The storage resource 308 may store an abnormality diagnosis program 310, and the abnormality diagnosis program 310 may include an operation command module 311 and a diagnosis module 312 which are a plurality of software modules called and executed in the main program of the abnormality diagnosis program 310. The storage resource 308 is, for example, a storage region provided by a computer-readable recording medium such as a semiconductor memory or a disk medium.

The operation command module 311 is interpreted and executed by the processor 307, and the hardware resources of the controller 306 and the operation command module 311 cooperate to thereby realize the function as the operation command unit 302 shown in FIG. 1. Similarly, the diagnosis module 312 is interpreted and executed by the processor 307, and the hardware resources of the controller 306 and the diagnosis module 312 cooperate to thereby realize the function as the diagnosis unit 303 shown in FIG. 1. In this manner, the functions of the operation command unit 302 and the diagnosis unit 303 may be realized by the cooperation between the hardware resources of the controller 306 and the abnormality diagnosis program 310, or may be realized using a dedicated hardware resource (for example, an application specific integrated circuit (ASIC), a field programmable gate array (FPGA), or the like) or a firmware.

The robot control device 300 includes a servo driver 313 as an example of the drive control device 304 shown in FIG. 1.

The robot control device 300 includes, as an example of the vibration detection unit 305 shown in FIG. 1, a torque sensor 314 for detecting a vibration component superimposed on the output torque of the servo motor 206. Besides, as the unit for detecting the output torque of the servo motor 206, the torque sensor 314 is not essential; for example, the output torque of the servo motor 206 may be detected from a command torque of the servo driver 313 or a torque obtained from the output current value of the servo motor 206.

Besides, the speed reducer 202 may include, for example, a bearing mechanism or a gear mechanism that rotates in synchronization with the rotation of the rotational shaft 204, and a vibration component may be generated due to damage of the bearing mechanism or the gear mechanism. It is known that the frequency of the vibration component generated due to the damage of the bearing mechanism or the gear mechanism is proportional to the rotational speed of the rotational shaft 204 ("Facility Management Technical Dictionary", 2003, P. 574). The cause of the vibration component is not limited to damage of the speed reducer 202 and may be, for example, damage of the part interlocked with the rotation of the rotational shaft 204. For example, a wave gear device referred to as Harmonic Drive (registered trademark) may be used as the speed reducer 202.

Next, a relationship between the rotational speed profile of the rotational shaft 204 and the vibration component generated from the speed reducer 202 is described with reference to FIGS. 3 to 8.

Figure 3:
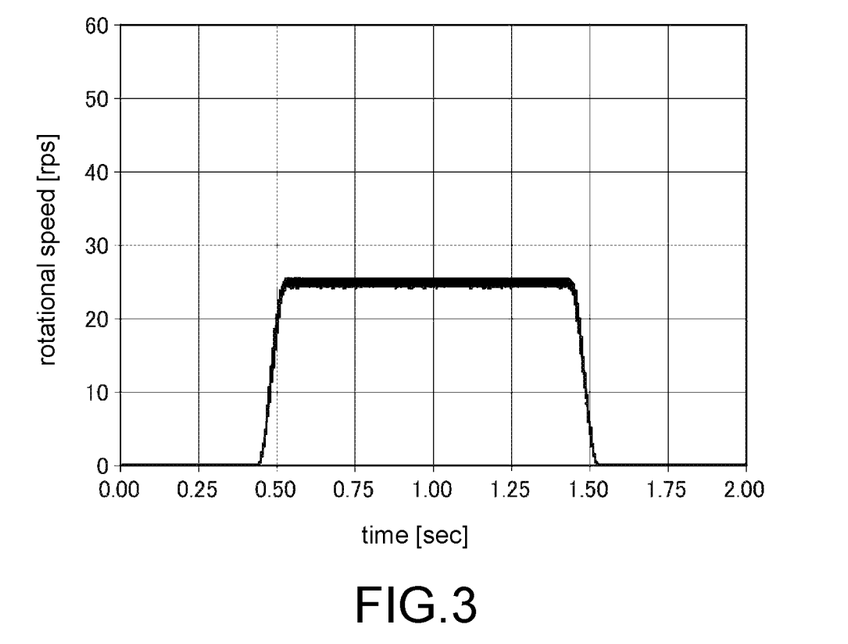
FIG. 3 is a graph showing an example of a rotational speed profile of a rotational shaft according to the embodiment.

FIG. 3 shows a rotational speed profile of the rotational shaft 204 when the rotational shaft 204 is rotated at a low speed from the starting angle position to the target angle position. The horizontal axis of FIG. 3 represents the time, and the vertical axis represents the rotational speed (the same applies to FIGS. 5 and 7).

Figure 4:
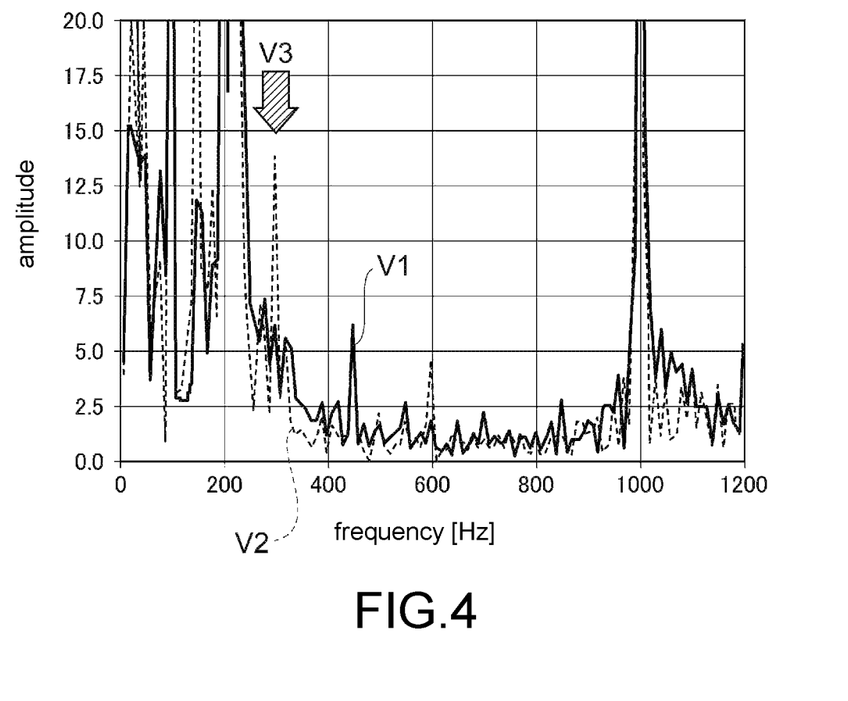
FIG. 4 is a graph showing vibration components by frequency of a speed reducer according to the embodiment.

FIG. 4 is a graph showing vibration components by frequency of the speed reducer 202 when the rotational shaft 204 is rotated based on the rotational speed profile shown in FIG. 3. The horizontal axis of FIG. 4 represents the frequency of the vibration component, and the vertical axis represents the amplitude of the vibration component (the same applies to FIGS. 6 and 8). Reference sign V1 represents the graph of the vibration component generated from the speed reducer 202 without abnormality, and reference sign V2 represents the graph of the vibration component generated from the speed reducer 202 with abnormality. Reference sign V3 represents the graph of the vibration component caused by the abnormality of the speed reducer 202. The vibration component V3 appears at a specific frequency proportional to the rotational speed of the rotational shaft 204. When the rotational speed of the rotational shaft 204 is in the low speed range, an amplitude difference between the vibration components V1 and V2 is relatively large, and thus it is suitable for detecting the vibration component V3 caused by the abnormality of the speed reducer 202.

Figure 5:
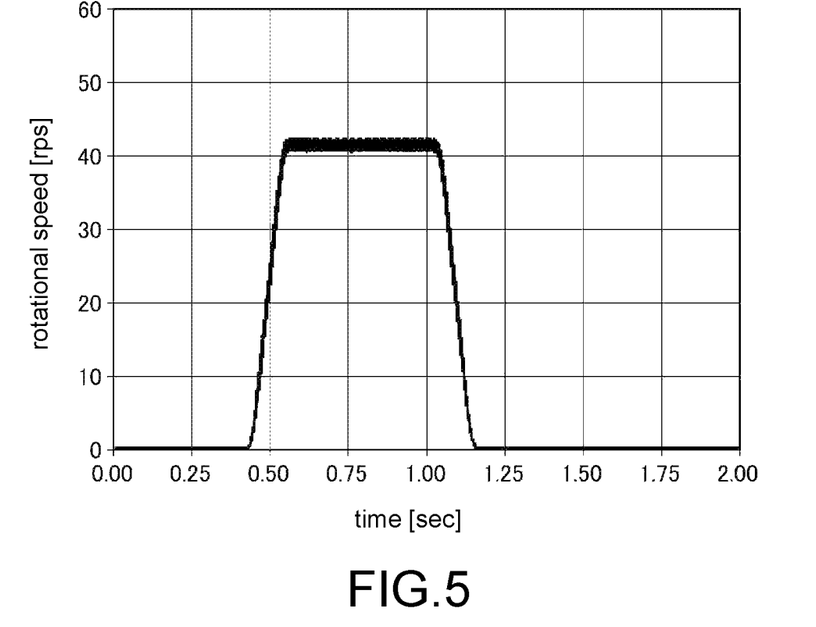
FIG. 5 is a graph showing an example of the rotational speed profile of the rotational shaft according to the embodiment.
Figure 6:
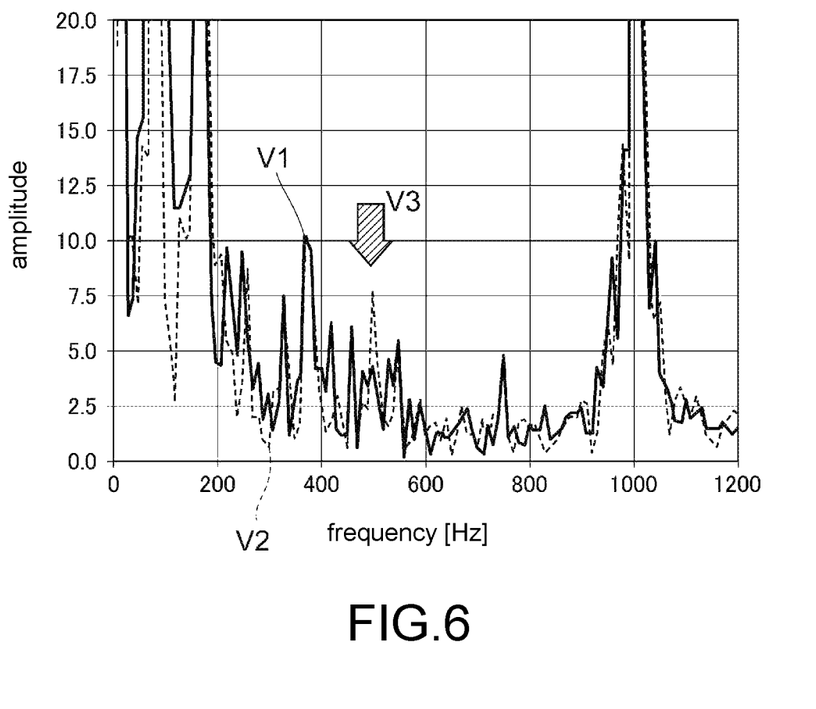
FIG. 6 is a graph showing the vibration components by frequency of the speed reducer according to the embodiment.

FIG. 5 shows a rotational speed profile when the rotational shaft 204 is rotated at a medium speed from the starting angle position to the target angle position, and FIG. 6 is a graph showing vibration components by frequency of the speed reducer 202 when the rotational shaft 204 is rotated based on the rotational speed profile shown in FIG. 5. In this manner, when the rotational speed of the rotational shaft 204 is increased from the low speed to the medium speed, the frequency of the vibration component V3 caused by the abnormality of the speed reducer 202 also increases, and the amplitude difference between the vibration components V1 and V2 becomes smaller.

Figure 7:
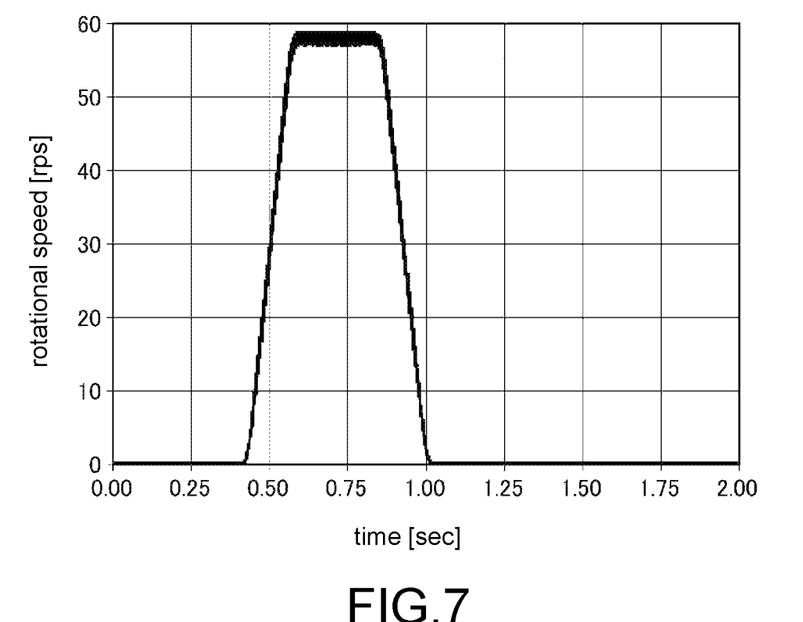
FIG. 7 is a graph showing an example of the rotational speed profile of the rotational shaft according to the embodiment.
Figure 8:
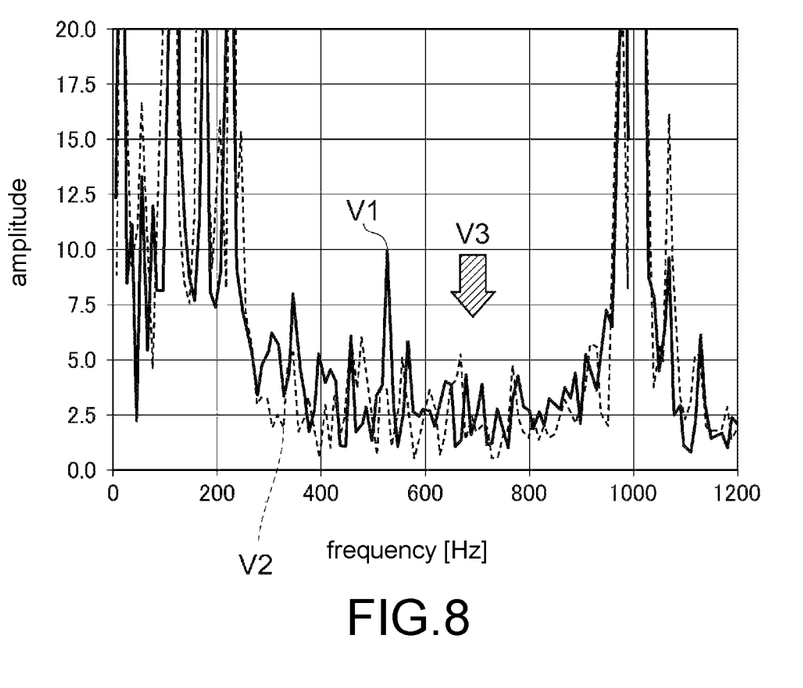
FIG. 8 is a graph showing the vibration components by frequency of the speed reducer according to the embodiment.

FIG. 7 shows a rotational speed profile when the rotational shaft 204 is rotated at a high speed from the starting angle position to the target angle position, and FIG. 8 is a graph showing vibration components by frequency of the speed reducer 202 when the rotational shaft 204 is rotated based on the rotational speed profile shown in FIG. 7. In this manner, when the rotational speed of the rotational shaft 204 is increased from the medium speed to the high speed, the frequency of the vibration component V3 caused by the abnormality of the speed reducer 202 also increases, and the amplitude difference between the vibration components V1 and V2 is further reduced. Then, the amplitude of the vibration component V3 caused by the abnormality of the speed reducer 202 also becomes small, which makes detection difficult. From the above, it is understood that the rotational speed range of the rotational shaft 204 includes ranges suitable for detecting the vibration component V3 caused by the abnormality and ranges unsuitable for the detection.

Figure 9:
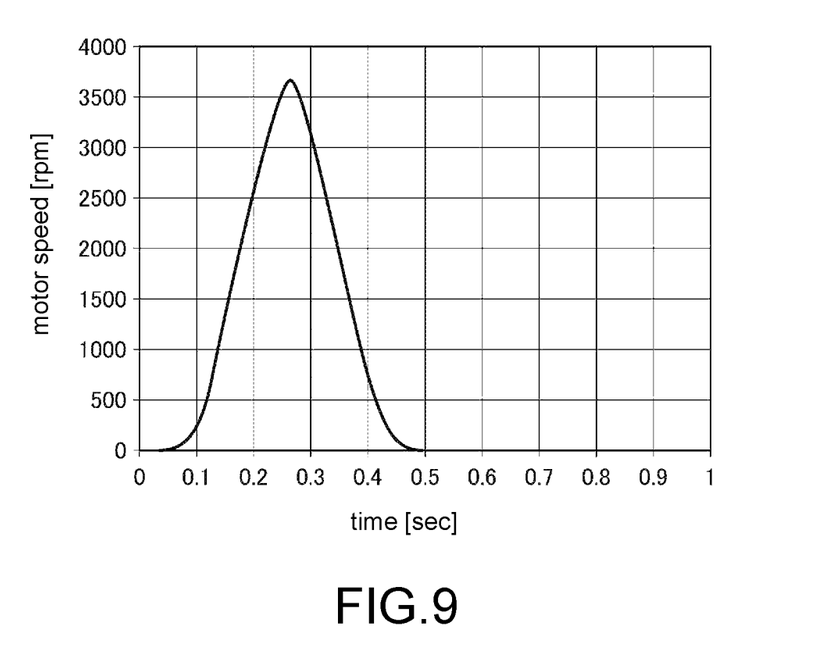
FIG. 9 is a graph showing an example of the rotational speed profile of the rotational shaft according to the embodiment.
Figure 10:
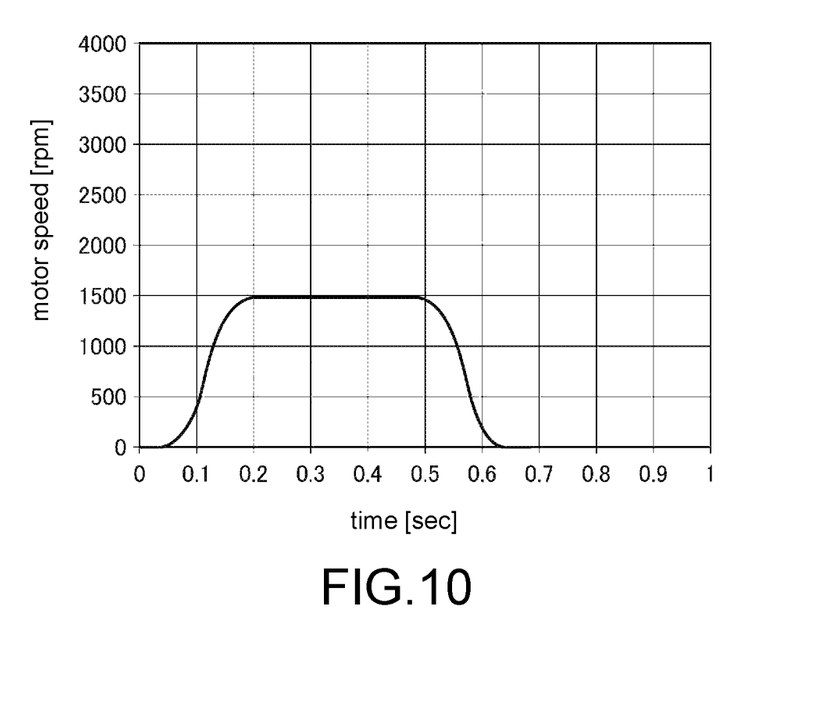
FIG. 10 is a graph showing an example of the rotational speed profile of the rotational shaft according to the embodiment.

FIG. 9 shows an example of the rotational speed profile of the rotational shaft 204 when the rotational shaft 204 rotates from the starting angle position to the target angle position when the arm 203 performs the normal operation. The horizontal axis of FIG. 9 represents the time, and the vertical axis represents the rotational speed (the same applies to FIG. 10). When the upper limit of the rotational speed of the rotational shaft 204 at which it is possible to detect the vibration component caused by the abnormality of the robot body 200 is, for example, 1500 rpm, it is difficult to detect the vibration component caused by the abnormality in the rotational speed profile shown in FIG. 9. Therefore, as shown in FIG. 10, by changing the rotational speed profile of the rotational shaft 204 so that the upper limit of the rotational speed of the rotational shaft 204 is 1500 rpm and the rotational shaft 204 rotates from the starting angle position to the target angle position, the vibration component caused by the abnormality can be accurately detected. The rotational speed profile of the rotational shaft 204 during abnormality diagnosis may be formed into a trapezoid shape as shown in FIG. 10 so as to include a period during which the rotational speed is constant. Thereby, the frequency of the vibration component caused by the abnormality becomes substantially constant, and the detection precision of the vibration component caused by the abnormality can be improved.

Figure 11:
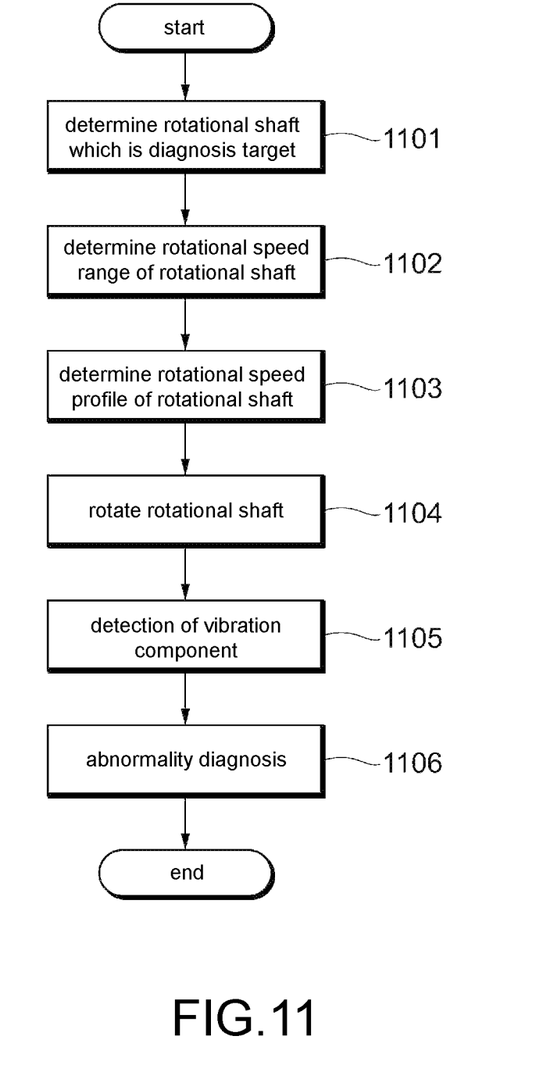
FIG. 11 is a flowchart showing an example of an abnormality diagnosis procedure for a robot body according to the embodiment.

FIG. 11 is a flowchart showing an example of an abnormality diagnosis procedure for the robot body 200.

In step 1101, an inspector determines a rotational shaft to be subjected to abnormality diagnosis among the rotational shafts 204 of the robot body 200. FIG. 2 illustrates a case in which the number of the rotational shafts 204 (the number of joints) of the robot body 200 is one, but the number of the rotational shafts 204 may be two or more, and the rotational shaft to be subjected to abnormality diagnosis is determined among the two or more rotational shafts 204.

In step 1102, in consideration of the performance (for example, the response frequency) of the torque sensor 314, the structure (for example, the pitch circle of bearings, the diameter, number, contact angle and the like of rolling elements) of the speed reducer 202, the specification (for example, the speed reduction ratio) of the speed reducer 202, the characteristic of the servo motor 206 or the servo driver 313, and the like, the inspector determines the range (upper limit and lower limit) of the rotational speed of the rotational shaft 204 in which it is possible to detect the vibration component caused by the abnormality, and gives a command of performing abnormality diagnosis on the rotational shaft 204 within the determined rotational speed range to the controller 306 through a superordinate controller 400.

In step 1103, in consideration of the angle required for the rotation of the rotational shaft 204 from the starting angle position to the target angle position and the rotational speed range determined in step 1102, the controller 306 determines the rotational speed profile of the rotational shaft 204 during abnormality diagnosis.

In step 1104, the controller 306 gives the servo driver 313 a command of rotating the rotational shaft 204 in the rotational speed profile determined in step 1103. The servo driver 313 performs feedback-control on the current supply to the servo motor 206 and rotates the rotational shaft 204, in order that the deviation between a feedback signal from the servo motor 206 (for example, information such as the angle position or the rotational speed) and a command value from the controller 306 (for example, a command value such as the angle position or the rotational speed) becomes zero.

In step 1105, the torque sensor 314 detects the vibration component superimposed on the output torque of the motor 201 and outputs information related to the detected vibration component to the controller 306.

In step 1106, the diagnosis module 312 performs frequency-analysis (for example, Fast Fourier Transform) on the information related to the vibration component input to the controller 306 to perform abnormality diagnosis. For example, when the amplitude of the vibration component with a specific frequency is significantly larger than the amplitude of the vibration component with other frequencies by a value exceeding the threshold, the diagnosis module 312 may judge that the vibration component with a specific frequency is the vibration component caused by the abnormality.

In the abnormality diagnosis of the robot 10 in the first hardware configuration, in consideration of the performance (for example, the response frequency) of the torque sensor 314, the structure (for example, the pitch circle of bearings, the diameter, number, contact angle and the like of rolling elements) of the speed reducer 202, the specification (for example, the speed reduction ratio) of the speed reducer 202, the characteristic of the servo motor 206 or the servo driver 313, and the like, the rotational speed range of the rotational shaft 204 in which it is possible to detect the vibration component caused by the abnormality is determined. Then, by adjusting the rotational speed of the rotational shaft 204 into the rotational speed range in which it is possible to detect the vibration component caused by an abnormality from among the vibration components generated along with the rotation of the rotational shaft 204, more vibration components caused by the abnormality can be detected compared with the normal operation duration, and thus the precision of the abnormality diagnosis can be improved.

In addition, by adjusting the rotational speed profile of the rotational shaft 204 during abnormality diagnosis into a trapezoid shape so as to include a period during which the rotational speed becomes constant, the frequency of the vibration component caused by the abnormality becomes substantially constant, and the detection precision of the vibration component caused by the abnormality can be improved.

In addition, in the abnormality diagnosis of the rotational shaft 204, by rotating the rotational shaft 204 from the starting angle position to the target angle position, the operation of the arm 203 during abnormality diagnosis is the same as the normal operation, and thus interference with other robots or equipment disposed around the robot 100 can be suppressed.

[Second Hardware Configuration]

Figure 12:
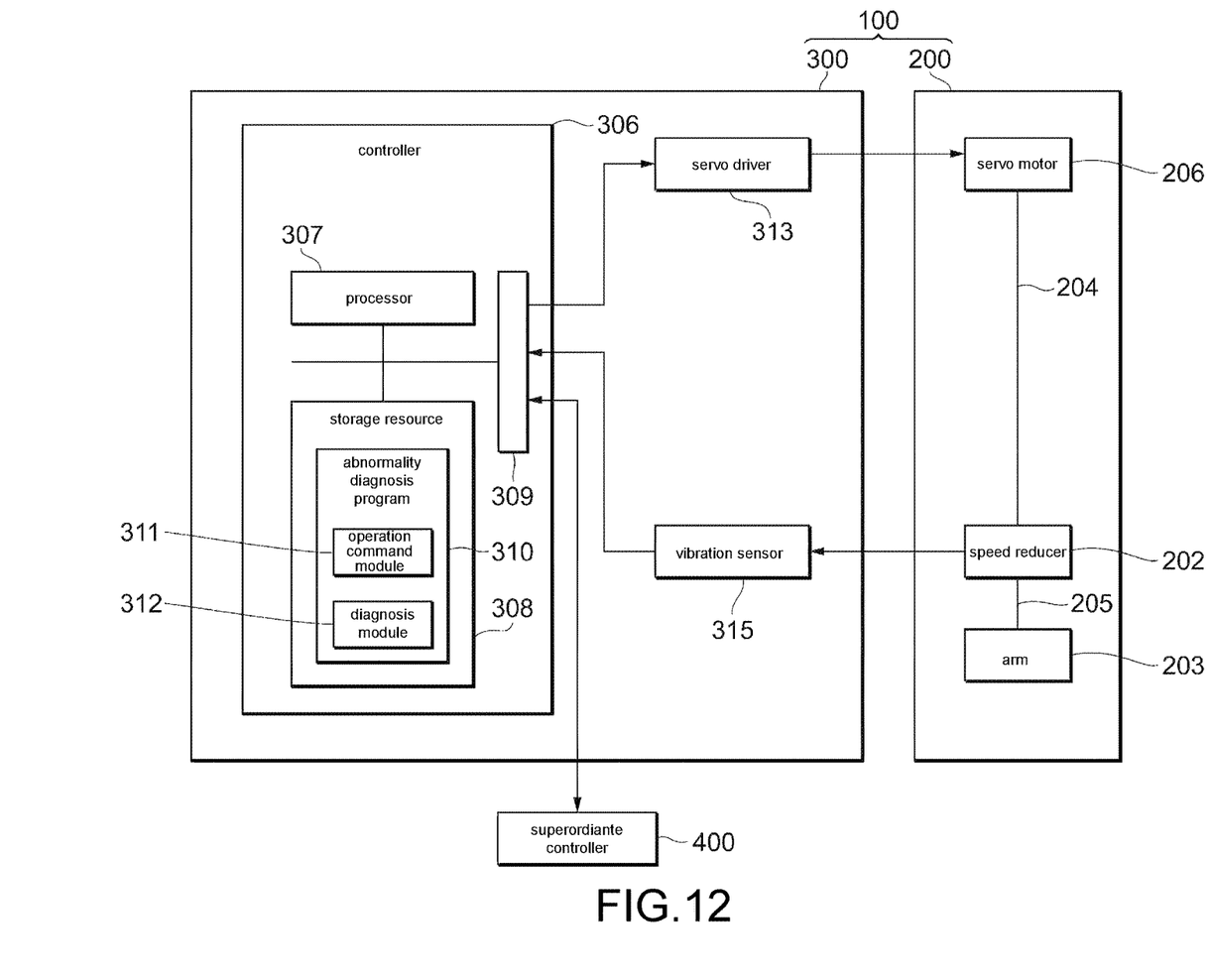
FIG. 12 is an illustrative diagram showing an example of a second hardware configuration of the robot according to the embodiment.

Next, an example of a second hardware configuration of the robot 100 is described centering on FIG. 12 and appropriately referring to FIG. 2.

The robot 100 in the second hardware configuration is different from the robot 100 in the first hardware configuration in terms of including a vibration sensor 315 for detecting a vibration component generated from the part (for example, the speed reducer 202) of the robot body 200 instead of the torque sensor 314 in the first hardware configuration shown in FIG. 2, and is the same as the robot 100 in the first hardware configuration at the other points.

In the abnormality diagnosis of the robot 100 in the second hardware configuration, in consideration of the performance (for example, the response frequency) of the vibration sensor 315, the structure (for example, the pitch circle of bearings, the diameter, number, contact angle and the like of rolling elements) of the speed reducer 202, the specification (for example, the speed reduction ratio) of the speed reducer 202, the characteristic of the servo motor 206 or the servo driver 313, and the like, the rotational speed range of the rotational shaft 204 in which it is possible to detect the vibration component caused by the abnormality is determined. Then, by adjusting the rotational speed of the rotational shaft 204 into the rotational speed range in which it is possible to detect the vibration component caused by an abnormality from among the vibration components generated along with the rotation of the rotational shaft 204, more vibration components caused by the abnormality can be detected compared with the normal operation duration, and thus the precision of the abnormality diagnosis can be improved.

The other effects of the robot 100 in the second hardware configuration are the same as the effects of the robot 100 in the first hardware configuration.

Besides, the robot 100 according to the embodiment is not limited to the industrial robot used in factory automation, and may be, for example, a robot used in the service industry (for example, an operating robot, a medical robot, a cleaning robot, a rescue robot, a security robot, and the like).

A part or all of the above embodiment can be described as, but not limited to, the following appendixes.

APPENDIX 1

A robot control device 300,
which performs abnormality diagnosis of a robot body 200 including a motor 201 that rotates a rotational shaft 204 from a starting angle position to a target angle position, wherein the rotational shaft 204 transmits power to an arm 203 so that the arm 203 performs a predetermined operation, the robot control device 300 including:
a drive control unit 304 that drives the motor 201 so that the rotational shaft 204 rotates from the starting angle position to the target angle position within a rotational speed range of the rotational shaft 204 in which it is possible to detect a vibration component caused by an abnormality from among the vibration components generated along with a rotation of the rotational shaft 204;
a vibration detection unit 305 that detects the vibration component; and a diagnosis unit 303 that performs the abnormality diagnosis based on the vibration component that has been detected.

APPENDIX 2

The robot control device 300 according to appendix 1, wherein,
within the rotational speed range of the rotational shaft 204 in which it is possible to detect the vibration component caused by the abnormality, a first rotational speed profile of the rotational shaft 204 when the rotational shaft 204 rotates from the starting angle position to the target angle position is different from a second rotational speed profile of the rotational shaft 204 when the rotational shaft 204 rotates from the starting angle position to the target angle position while the arm 203 performs the predetermined operation.

APPENDIX 3

The robot control device 300 according to appendix 1 or 2, wherein,
within the rotational speed range of the rotational shaft 204 in which it is possible to detect the vibration component caused by the abnormality, the first rotational speed profile and the second rotational speed profile of the rotational shaft 204 when the rotational shaft 204 rotates from the starting angle position to the target angle position includes a period during which a rotational speed of the rotational shaft 204 is constant.

APPENDIX 4

An abnormality diagnosis method,
in which a robot control device 300 diagnoses an abnormality of a robot body 200 including a motor 201 that rotates a rotational shaft from a starting angle position to a target angle position, wherein the rotational shaft 204 transmits power to an arm 203 so that the arm 203 performs a predetermined operation,
wherein the robot control device 300 executes:
step 1104 for driving the motor 201 so that the rotational shaft 204 rotates from the starting angle position to the target angle position within a rotational speed range of the rotational shaft 204 in which it is possible to detect a vibration component caused by the abnormality from among the vibration components generated along with a rotation of the rotational shaft 204;
step 1105 for detecting the vibration component; and
step 1106 for performing the abnormality diagnosis based on the vibration component that has been detected.

APPENDIX 5

An abnormality diagnosis program 310 for causing a robot control device 300 to execute abnormality diagnosis of a robot body 200 including a motor 201 that rotates a rotational shaft from a starting angle position to a target angle position, wherein the rotational shaft 204 transmits power to an arm 203 so that the arm 203 performs a predetermined operation,
wherein the robot control device 300 is caused to execute:
step 1104 for driving the motor 201 so that the rotational shaft 204 rotates from the starting angle position to the target angle position within a rotational speed range of the rotational shaft 204 in which it is possible to detect a vibration component caused by an abnormality from among the vibration components generated along with a rotation of the rotational shaft 204;
step 1105 for detecting the vibration component; and
step 1106 for performing the abnormality diagnosis based on the vibration component that has been detected.

What is claimed is:
1. A robot control device,
which performs abnormality diagnosis of a robot body comprising a motor that rotates a rotational shaft from a starting angle position to a target angle position, wherein the rotational shaft transmits power to an arm so that the arm performs a predetermined operation, the robot control device comprising:
a drive control unit that drives the motor so that the rotational shaft rotates from the starting angle position to the target angle position within a rotational speed range of the rotational shaft in which it is possible to detect a frequency of a vibration component caused by an abnormality from among the vibration components generated along with a rotation of the rotational shaft;
a vibration detection unit comprising a torque sensor that detects the frequency of the vibration component; and a diagnosis unit that performs the abnormality diagnosis based on the frequency of the vibration component that has been detected, wherein the starting angle position of the rotational shaft in the abnormality diagnosis is the same as the starting angle position in a normal operation, and the target angle position of the rotational shaft in the abnormality diagnosis is the same as the target angle position of the rotational shaft in the normal operation, wherein a rotational speed profile of the rotational shaft during abnormality diagnosis is adjusted into a trapezoid shape by the robot control device, so as to include a period during which the rotational speed becomes constant.

2. The robot control device according to claim 1, wherein, within the rotational speed range of the rotational shaft in which it is possible to detect the frequency of the vibration component caused by the abnormality, a first rotational speed profile of the rotational shaft when the rotational shaft rotates from the starting angle position to the target angle position is different from a second rotational speed profile of the rotational shaft when the rotational shaft rotates from the starting angle position to the target angle position while the arm performs the predetermined operation.

3. The robot control device according to claim 2, wherein, within the rotational speed range of the rotational shaft in which it is possible to detect the frequency of the vibration component caused by the abnormality, the first rotational speed profile and the second rotational speed profile of the rotational shaft when the rotational shaft rotates from the starting angle position to the target angle position comprises a period during which a rotational speed of the rotational shaft is constant.

4. An abnormality diagnosis method, in which a robot control device diagnoses an abnormality of a robot body comprising a motor that rotates a rotational shaft from a starting angle position to a target angle position, wherein the rotational shaft transmits power to an arm so that the arm performs a predetermined operation, wherein the robot control device executes:
a step for driving the motor so that the rotational shaft rotates from the starting angle position to the target angle position within a rotational speed range of the rotational shaft in which it is possible to detect a frequency of a vibration component caused by the abnormality from among the vibration components generated along with a rotation of the rotational shaft;
a step for detecting the frequency of the vibration component by using a torque sensor; and
a step for performing the abnormality diagnosis based on the frequency of the vibration component that has been detected, wherein the starting angle position of the rotational shaft in the abnormality diagnosis is the same as the starting angle position in a normal operation, and the target angle position of the rotational shaft in the abnormality diagnosis is the same as the target angle position of the rotational shaft in the abnormality diagnosis, wherein a rotational speed profile of the rotational shaft during abnormality diagnosis is adjusted into a trapezoid shape by the robot control device, so as to include a period during which the rotational speed becomes constant.

5. A non-transitory computer readable medium storing an abnormality diagnosis program for causing a robot control device to execute abnormality diagnosis of a robot body comprising a motor that rotates a rotational shaft from a starting angle position to a target angle position, wherein the rotational shaft transmits power to an arm so that the arm performs a predetermined operation, wherein the robot control device is caused to execute:
a step for driving the motor so that the rotational shaft rotates from the starting angle position to the target angle position within a rotational speed range of the rotational shaft in which it is possible to detect a frequency of a vibration component caused by an abnormality from among the vibration components generated along with a rotation of the rotational shaft;
a step for detecting the frequency of the vibration component by using a torque sensor; and
a step for performing the abnormality diagnosis based on the frequency of the vibration component that has been detected, wherein the starting angle position of the rotational shaft in the abnormality diagnosis is the same as the starting angle position in a normal operation, and the target angle position of the rotational shaft in the abnormality diagnosis is the same as the target angle position of the rotational shaft in the abnormality diagnosis, wherein a rotational speed profile of the rotational shaft during abnormality diagnosis is adjusted into a trapezoid shape by the robot control device, so as to include a period during which the rotational speed becomes constant.

6. The robot control device according to claim 2, wherein, within the rotational speed range of the rotational shaft in which it is possible to detect the frequency of the vibration component caused by the abnormality, the first rotational speed profile and the second rotational speed profile of the rotational shaft when the rotational shaft rotates from the starting angle position to the target angle position comprises a period during which a rotational speed of the rotational shaft is constant.

* * * * *